Oct. 8, 1935.  J. H. BLAIR  2,016,766
DENTAL HANDPIECE
Filed May 9, 1932  2 Sheets-Sheet 1
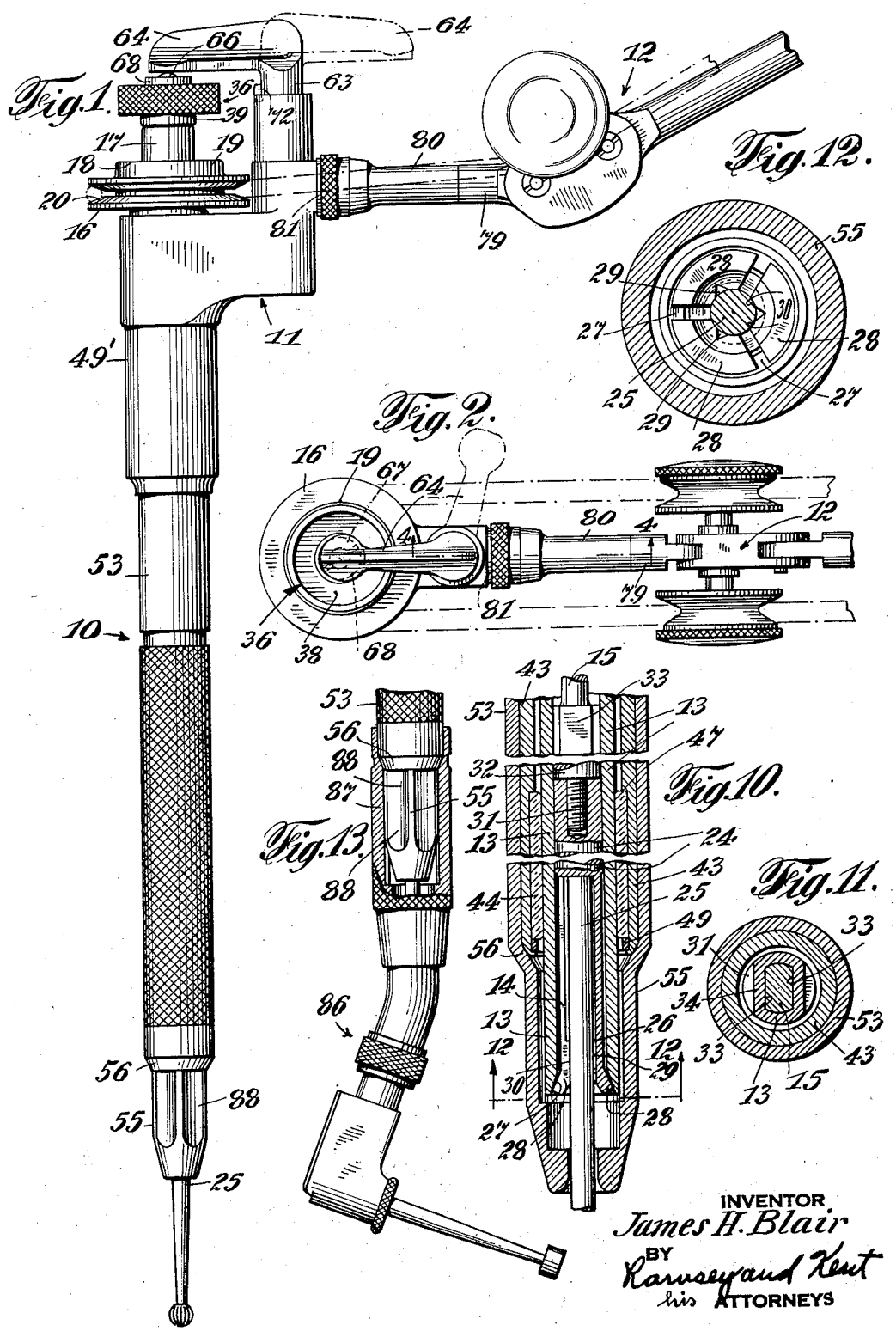
INVENTOR
James H. Blair
BY
Ramsey and Kent
his ATTORNEYS Oct. 8, 1935. J. H. BLAIR 2,016,766
DENTAL HANDPIECE
Filed May 9, 1932 2 Sheets-Sheet 2
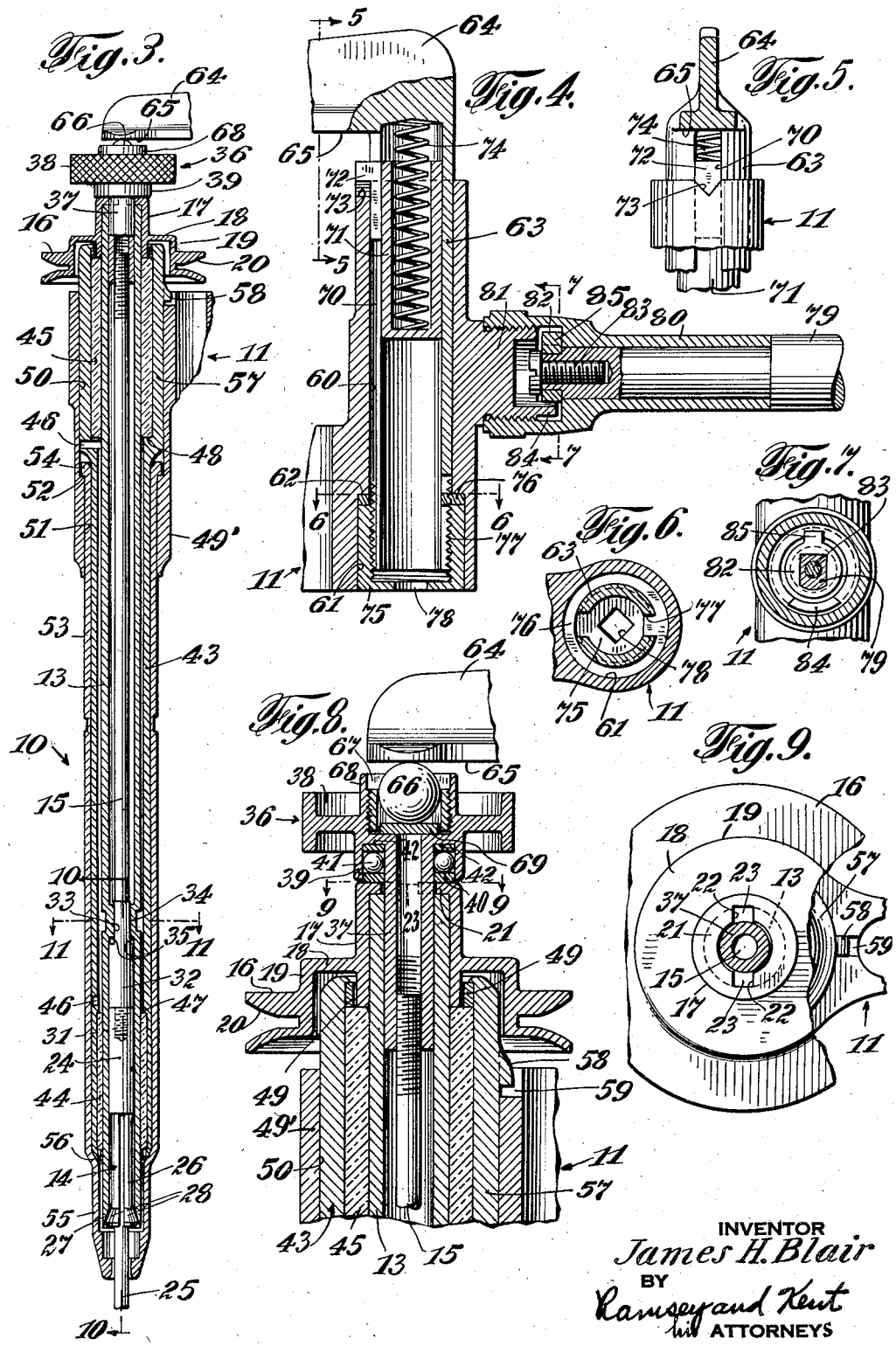
INVENTOR
James H. Blair
BY
Ramsey and Kent
ATTORNEYS Patented Oct. 8, 1935

2,016,766

UNITED STATES PATENT OFFICE 2,016,766

DENTAL HANDPIECE

James Henry Blair, Staten Island, N. Y., assignor to Chayes Dental Instrument Corporation, New York, N. Y., a corporation of New York Application May 9, 1932, Serial No. 610,118

11 Claims. (Cl. 32—26)

This invention relates to dental handpieces.

A primary object of the invention is to provide a dental handpiece of improved design, which is efficient in operation, and which can be easily and quickly disassembled to permit thorough sterilization of the separate parts, and which can be reassembled with equal speed and facility.

A further object resides in the arrangement of thrust bearings to take up thrust with a minimum of friction loss when pressure is applied to the dental tool either toward or away from the handpiece.

The invention also includes a simplified means for adjustment of clearance between the operating parts of the handpiece. This object is accomplished by providing a single adjusting screw which controls the contact between all of the removable parts.

The parts of the improved handpiece are so designed that they can be manufactured by efficient and inexpensive process.

These and other objects and advantages of the invention will become apparent as the description proceeds.

While a preferred form of the invention has been disclosed herein for purposes of illustration, it should be understood that various changes may be made in the structure without departing from the spirit of the invention as hereinafter set forth and claimed.

In the drawings:

Fig. 1 is a side elevation of a handpiece embodying the invention;

Fig. 2 is an end elevation looking at the handpiece from the upper side of Fig. 1;

Fig. 3 is a longitudinal section through the handpiece, parts being shown in elevation;

Fig. 4 is a section on line 4—4 of Fig. 2;

Fig. 5 is a section on line 5—5 of Fig. 4;

Fig. 6 is a section on line 6—6 of Fig. 4;

Fig. 7 is a section on line 7—7 of Fig. 4;

Fig. 8 is a fragmentary sectional view showing on a larger scale the parts of the upper end of Fig. 3;

Fig. 9 is a section on line 9—9 of Fig. 8;

Fig. 10 is a section on line 10—10 of Fig. 3;

Fig. 11 is a section on line 11—11 of Fig. 3;

Fig. 12 is a section on line 12—12 of Fig. 10;

Fig. 13 is a fragmentary elevation with parts and sections showing an angle attachment mounted on the front end of the handpiece.

The improved dental handpiece comprises broadly a barrel portion 10 mounted in a bracket 11 which is carried by an elbow joint 12.

Referring to the drawings more particularly, it will be seen in Fig. 3 that the barrel portion encloses a tubular shaft 13 and that a chuck 14 is mounted in the front end of the tubular shaft and is operated by a drawbar 15. The shaft 13 is driven by a pulley 16 which is mounted on the shaft in a manner illustrated more fully in Figs. 8 and 9.

The pulley mounting includes a hub 17 which slips over shaft 13 and carries a radially extending web 18 and an offset flange 19 to which the pulley is connected. With this construction the pulley overhangs the inner end of hub 17, as will be clear from Fig. 8, so that the center of pulley groove 20 is located inwardly from the inner end of hub 17. In order to provide a driving connection between pulley 16 and shaft 13 without the use of any keys or set screws, the outer end of hub 17 is formed with a flange 21 which extends over the end of shaft 13. Two oppositely arranged notches 22 are formed in flange 21 and the end of shaft 13 carries two lugs 23 which fit into the notches 22.

Referring now to Figs. 3 and 10, the chuck is formed with a cylindrical inner part 24, its outer end being hollowed out to receive the stem 25 of a removable dental tool, the outer end of the chuck being also slotted to form a plurality of resilient jaws 26. The end of tubular shaft 13 is formed with an inner conical shoulder 27 and the outer end of each jaw 26 carries an outwardly flared extension 28. The inner surface of each of the jaws 26 is grooved as shown at 29 to provide a plurality of inwardly extending gripping surfaces 30.

The outer faces of the flared extensions 28 are given a conical form and the angle of conicity of these outer faces relative to the axis of the chuck is greater than the angle of conicity of the conical shoulder 27, hence when the chuck is moved inwardly relative to shaft 13, the extreme outer corner of conical shoulder 27 engages the outer surfaces of the flared extensions 28 and bends the outer ends of the extensions 28 toward the axis of the chuck thereby causing the outer edges of gripping surfaces 30 to bite into the stem 25 to obtain a very firm grip on stem 25.

The chuck is reciprocated within the shaft 13 by the drawbar 15 and the drawbar is connected to the chuck by any suitable means, such as the screw-threaded engagement 31. The drawbar is caused to rotate with the shaft 13 by the construction which will now be described:

The forward end of the drawbar is formed with an enlargement 32 which is cut away at opposite sides to form the flat faces 33, shown especially in Figure 11. The wall of the tubular shaft 13 is dented inwardly at opposite sides to form lugs 34 which closely engage the flat faces 33 formed on the drawbar. The shoulders 35 at the forward ends of the flat faces 33 are so located as to engage lugs 34 to limit inward movements of the chuck. As will be clear from Fig. 3 these shoulders 35 prevent inward movement of the chuck, when the chuck is empty, more than a short distance from the position illustrated in Fig. 3, and thus prevents injury to the jaws of the chuck by accidently drawing the chuck too far inwardly.

Movement of the drawbar 15 is provided by an adjusting screw 36 which includes a tubular extension 37 having screw-threaded connection with the drawbar, and a thumb nut 38.

In order to provide for translating substantially the entire turning force applied to thumb nut 38 into gripping force at the chuck and to prevent the absorption of any of this force by excessive friction between the adjusting screw and the flange 21 of hub 17, a thrust bearing is interposed between adjusting screw 36 and flange 21. This thrust bearing is located in an annular channel formed by hub 39 which surrounds tubular extension 37. A thrust plate 40 is mounted in the annular channel for free rotation and is held in place by spinning over the end of hub 39. The exposed surface of thrust plate 40 extends beyond the end of hub 39, as clearly shown in Fig. 8 and engages the end of flange 21. A series of suitable bearing balls 41 are mounted between thrust plate 40 and a hardened wear seat 42.

When the adjusting screw is tightened upon the drawbar 15 the drawbar is pulled upward in Figs. 3 and 8, and this movement is transmitted to the chuck and causes a gripping movement of the chuck jaws. The force which pulls the drawbar upward also tends to pull the adjusting screw downward against flange 21. The ball thrust bearing substantially eliminates all friction between the adjusting screw 36 and flange 21 and makes it easy to obtain a firm grip of the chuck upon the stem of the drill by light pressure applied to the adjusting screw.

The shaft 13 is mounted for rotation in a bearing sleeve 43, the shaft being carried by a front bearing 44 and a rear bearing 45. Oil holes 46 are suitably located to provide lubrication to the bearings.

In order to permit thorough sterilization in boiling water, all of the parts of applicant's improved handpiece are formed of suitable non-corroding material, such as stainless steel. However, as stainless steel does not form a good bearing against itself, it is impossible to use this material for the bearing sleeves 44 and 45. Applicant therefore forms these bearings of a suitable heat-resisting glass, such as pyrex, which will stand immersion in boiling water. These glass bearings can be ground to a very high finish and operate with a very low coefficient of friction.

The bearings 44 and 45 engage shoulders 47 and 48, respectively, formed on the inside of the bearing sleeve, and the bearings are held in place by retaining rings 49 (see Figure 8) which in turn are kept in position by spinning inwardly the ends of the bearing sleeve.

Reference will now be made to the manner in which the parts are assembled and held in place in the mounting bracket 11:

The mounting bracket 11 is formed with a barrel portion 49' which is formed with a main bore 50 and with a reduced bore 51 at its forward end, leaving a shoulder 52 between the two bores. A cover sleeve 53 is formed with such an external diameter that it fits within the bore 51 and this sleeve carries at its rear end an external shoulder 54. This sleeve 53 is placed in position by passing it through the bore 50 until it comes into position with its shoulder 54 engaging shoulder 52 of barrel portion 49'.

The forward end of cover sleeve 53 is formed into a reduced tip 55 and an internal conical shoulder 56 is located at the point where the reduced tip joins the main body of the cover sleeve.

The greater part of bearing sleeve 43 is made of such an external size as to fit within cover sleeve 53, but the rear end of bearing sleeve 43 is formed with an enlargement 57 which fits within bore 50. In assembling the parts the bearing sleeve is inserted into the cover sleeve until the forward end of the bearing sleeve engages conical internal shoulder 56 formed on the cover sleeve. The bearing sleeve is held against rotation by means of a lug 58 which is formed on the bearing sleeve and engages a notch 59 cut into the barrel portion 49' (see Figs. 8 and 9).

In the next step of the assembling operation the shaft 13 is inserted in the bearing sleeve from the upper end of Fig. 3 to a position in which hub 17 engages the end of bearing sleeve 45 as clearly seen in Figs. 3 and 8. The shaft carries with it its associated parts, namely, the clutch, drawbar, adjusting screw and operating pulley.

The parts are held in place within the barrel portion 49' by the holding and adjusting mechanism which will now be described:

A part of the bracket 11 lying below barrel 49' is formed with a bore 60 and with an enlarged counterbore 61, a shoulder 62 being formed between the bore and the counterbore. An L-shaped holding member has a cylindrical stem 63 which fits within bore 60, and an arm 64 which carries a flat bearing face 65. The cylindrical stem 63 is freely rotatable within bore 60 permitting the holding member to be moved either to the latched position illustrated in full lines in Fig. 1, in which the parts are held in assembled relation, or to the open position, shown in dotted lines in Fig. 1, to permit disassembly of the parts. When in the latched position the flat bearing face 65 of the holding member is in engagement with a ball thrust bearing 66 mounted on the end of shaft 13, the thrust ball being held in place by a retainer 67 which screws into hub 68 and holds the ball in contact with the thrust plate 69 which is formed of hardened stainless steel.

The stem 63 is formed with a slot 70 and a carrier 71 within the tubular stem carries a detent 72 which slides in slot 70 and engages a notch 73 formed in the bracket 11. A spring 74 biases the detent into engagement with the notch to hold the arm in the latched position of Fig. 1 against accidental displacement.

The tubular stem 63 is adjusted longitudinally by a tubular adjusting screw 75 which has screw-threaded engagement with the end of stem 63. The inner end of the adjusting screw 75 has a bearing against shoulder 62, and in order to prevent unintentional movement of adjustment screw 75 relative to stem 63, a tongued washer 76 is interposed between the end of adjusting screw 75 and shoulder 62 and engages in a slot 77 formed in stem 63.

The outer end of adjusting screw 75 is formed with an opening 78 of appropriate shape to cooperate with an adjusting tool. In order to provide for firm frictional engagement between the stem 63 and bore 60 and also between the stem 63 and adjusting screw 75, the end of stem 63 is spread slightly after slots 76 and 77 have been formed therein.

When the arm 64 is in the latched position of Fig. 3, it holds all of the operating parts in assembled relation as follows:

1. The inner end of hub 17 is held in contact with bearing 45.

2. The forward end of bearing sleeve 43 is held in contact with conical shoulder 56 formed on cover sleeve 53.

3. The shoulder 54 of cover sleeve 53 is held in contact with internal shoulder 52 formed within barrel portion 49'.

Thus all of the adjustable contacts in the operating parts are controlled by the single adjusting screw 75 and tightening or loosening movement of the adjusting screw 75 causes simultaneous tightening or loosening of all of the contact points above mentioned. For simplicity it may be said that the various operating parts are held assembled in substantially nested relation by means of the single holding member or arm 64.

The bracket 11 is secured to the elbow joint 12 detachably by the connection illustrated in Figs. 4 and 7.

A stem 79 extends upwardly from the elbow and a sleeve 80 surrounds stem 79 and has screw-threaded engagement with a stud 81 carried by bracket 11. The sleeve 80 is rotatably held in place on stem 79 by a washer 82 which in turn is held by a screw 83. The washer 82 is formed with an irregularly shaped hole which engages a similarly shaped extension so that the washer can be assembled on stem 79 in only one position. A lug 84 depends from stud 81 and engages a stop 85 formed on washer 82 to limit rotation of bracket 11 relative to stem 79.

In order to provide for operation of a dental tool with its stem at an angle to the main axis of the handpiece an angular attachment 86 is provided, as shown in Figure 13. This annular attachment is mounted in place by means of a sleeve 87 which has a close frictional fit over a hexagonal portion 88 formed on reduced tip 55 of cover sleeve 53.

The above description will make clear to those skilled in the art the many advantages of the simplified and efficient construction afforded by the present invention.

Among other things may be mentioned the fact that working parts can be easily and quickly disassembled for purposes of sterilization. A simple movement of arm 64 from the holding position to the dotted line position of Fig. 1 permits the operator to slide from barrel 49' and separate from each other the cover sleeve 53, the bearing sleeve 43 and the tubular shaft 13 and parts carried thereby. By removing the adjusting screw 36 the operator can quickly remove from the shaft 13 the clutch and drawbar and the operating pulley. The reverse operation of reassembling the parts can be accomplished just as easily and quickly.

As previously mentioned, all the parts of the handpiece are composed of materials that will stand boiling water for purposes of sterilization.

The fact that all of the various adjustable contacts of the working parts are controlled by a single adjusting member has also been referred to.

Another advantageous feature resides in the fact that the bearings are so arranged as to permit the handpiece to operate with a minimum of friction under all conditions. The fact that the main bearings are composed of glass results in a minimum of friction and wear in connection with these bearings. The arrangement of a pulley 16 offset inwardly from the end of pulley hub 17 as shown in Figs. 3 and 8 causes the downward pull of the belt to be transmitted straight inwardly to the bearing avoiding the excess friction resulting from the leverage which this downward pull would have if the pulley were disposed in line with the radial flange 18.

When the operator, in using the drill, pushes forwardly against the drill, the thrust is transmitted directly through shaft 13 to ball thrust 66 which engages arm 64. Conversely, when in drilling a cavity the drill stem is moved forwardly relative to the handpiece, the thrust is transmitted from shaft 13 to pulley sleeve 17 which is pulled forwardly against the end of glass bearing sleeve 45.

It should also be pointed out that the cover sleeve 53 is floatingly mounted so that it can follow without resistance every movement of the operator's hand. There is no force tending to rotate the cover sleeve because the rotating shaft 13 does not come in contact with sleeve 53 and the bearing sleeve 43 is held against rotation by lug 58 engaging barrel 49'.

I claim:

1. A dental handpiece comprising a bracket, a holding member mounted on the bracket, and operating parts mounted on the bracket and including in part a shaft cover sleeve, a shaft within said sleeve, a clutch rotating with the shaft, and a pulley attachable to the shaft, said operating parts being assembled in substantially nested relation, said holding member being movable to a latched position to engage an operating part to hold all of the operating parts in said nested relation relative to the bracket and to lock the pulley to the shaft for rotation therewith, or to an unlatched position permitting removal of said operating parts from said bracket.

2. A dental handpiece comprising a bracket, a cover sleeve, a bearing sleeve mounted within the cover sleeve, a cylindrical shaft within the bearing sleeve, a clutch within the cylindrical shaft, an operating pulley on the shaft, and a holding member pivotally secured to said bracket, said holding member being movable to a latched position to hold said cover sleeve, bearing sleeve, shaft and pulley in operating relation to said bracket, or to an unlatched position permitting removal of said cover sleeve, bearing sleeve and shaft from said bracket.

3. A dental handpiece comprising a bracket formed with a barrel portion, a cover sleeve mounted in the barrel portion, a bearing sleeve mounted in the barrel portion, a shaft extending through the bearing sleeve and carrying at its forward end means to hold a dental tool, means for rotating the shaft, a holding member mounted on the bracket for holding the shaft in place, and an anti-friction thrust bearing arranged to take up thrust between the shaft and the holding member.

4. A dental handpiece comprising a bracket formed with a barrel portion, a cover sleeve mounted in the barrel portion, a bearing sleeve mounted in the barrel portion, a shaft extending through the bearing sleeve and carrying at its forward end means to hold a dental tool, a thrust bearing mounted on the rear end of the shaft, and a holding member pivotally mounted on the bracket and movable to a latched position in which it engages the thrust bearing to hold the operating parts in place, or to an unlatched position permitting removal of said operating parts from said bracket.

5. A dental handpiece comprising a bracket formed with a barrel portion, an internal shoulder formed in the barrel portion, a cover sleeve mounted in the barrel portion and formed with a shoulder having a working contact with said barrel shoulder, the cover sleeve being formed with an internal shoulder at its forward end, a bearing sleeve extending within the cover sleeve and having a working contact with said internal shoulder on the cover sleeve, a rotatable shaft extending through the bearing sleeve, a part carried by the shaft having a working contact with a part carried by the bearing sleeve, and a single adjusting device for adjusting all of said working contacts.

6. A dental handpiece comprising a cylindrical shaft, a chuck reciprocable within the shaft, a drawbar within the shaft and connected to the chuck for operating the chuck, the drawbar being provided with at least one flat surface, said shaft having a portion of its wall forced inwardly to form a flat internal surface for engagement with the flat surface on the drawbar to cause the drawbar to rotate with the shaft.

7. A dental handpiece comprising a cylindrical shaft, a chuck reciprocable within the forward end of the shaft, a drawbar within the shaft and connected to the chuck, an adjusting screw having screw-threaded connection with the drawbar, and an anti-friction thrust bearing located between the adjusting screw and the end of the shaft.

8. A dental handpiece comprising a cylindrical shaft, a pulley hub fitting over one end of the shaft, a flange extending inwardly from the hub over at least part of the end wall of the shaft, the flange being formed with at least one notch, the shaft carrying a lug which engages in the notch to cause the shaft to rotate with the pulley hub.

9. A dental handpiece comprising a bracket carrying operating parts, an externally-threaded stud extending downwardly from the bracket, a stem, a sleeve surrounding the stem, a washer non-rotatively mounted on the stem and carrying a stop, the washer serving to hold the sleeve in place, a lug depending from the stud and engaging the stop on the washer to limit turning movement of the bracket relative to the stem, the sleeve having threaded engagement with the external threads on the stud.

10. A dental handpiece comprising a cylindrical shaft, a pulley hub fitting over one end of the shaft, a flange extending inwardly from the hub over at least part of the end wall of the shaft, the flange being formed with at least one notch, the shaft carrying a lug which engages in the notch to cause the shaft to rotate with the pulley hub, a chuck reciprocable within the forward end of the shaft, a draw-bar within the shaft and connected to the chuck, an adjusting screw having screw threaded engagement with the draw-bar, said adjusting screw being so positioned relative to said pulley that manipulation of the adjusting screw to lock a tool in the chuck tightens the connection between the pulley and the shaft.

11. A dental handpiece comprising a bracket formed with a barrel portion, a cover sleeve rotatably mounted in the barrel portion, a bearing sleeve non-rotatably mounted in the barrel portion and extending into the cover sleeve, a shaft extending into the bearing sleeve and provided with means to hold a dental tool, means for rotating the shaft, and a holding member pivotally secured to said bracket for holding all of said parts in operative position relative to said barrel portion.

JAMES HENRY BLAIR.